US011095579B1

(12) United States Patent
de Mazancourt et al.

(10) Patent No.: US 11,095,579 B1
(45) Date of Patent: Aug. 17, 2021

(54) CHATBOT WITH PROGRESSIVE SUMMARY GENERATION

(71) Applicant: YSEOP SA, Lyons (FR)

(72) Inventors: Hugues Sézille de Mazancourt, Thiais (FR); Alain Kaeser, Paris (FR)

(73) Assignee: YSEOP SA, Lyons (FR)

( * ) Notice: Subject to any disclaimer, the term of this patent is extended or adjusted under 35 U.S.C. 154(b) by 0 days.

(21) Appl. No.: 16/875,420

(22) Filed: May 15, 2020

Related U.S. Application Data

(60) Provisional application No. 63/018,889, filed on May 1, 2020.

(51) Int. Cl.
G06Q 30/02 (2012.01)
H04L 12/58 (2006.01)
G06F 40/40 (2020.01)

(52) U.S. Cl.
CPC .............. *H04L 51/02* (2013.01); *G06F 40/40* (2020.01); *H04L 51/16* (2013.01)

(58) Field of Classification Search
CPC .......... H04L 51/02; H04L 51/16; G06F 40/40
See application file for complete search history.

(56) References Cited

U.S. PATENT DOCUMENTS

| 10,170,106 B2 | 1/2019 | Gelfenbeyn et al. |
| 2017/0048170 A1* | 2/2017 | Smullen ................. H04L 67/02 |
| 2018/0337872 A1 | 11/2018 | Fawcett |
| 2019/0005024 A1 | 1/2019 | Somech et al. |
| 2020/0007474 A1 | 1/2020 | Zhang et al. |

* cited by examiner

*Primary Examiner* — Soe Hlaing
(74) *Attorney, Agent, or Firm* — Wolf, Greenfield & Sacks, P.C.

(57) ABSTRACT

Methods and apparatus for summarizing a chatbot interaction with a user are provided. The method comprises using at least one computer hardware processor to perform generating an initial summary based, at least in part, on user data, receiving first input from the user during the chatbot interaction, processing the first input with a natural language processing engine, updating the initial summary based, at least in part, on an output of the processing by the natural language processing engine to generate an updated summary, wherein the updating is performed prior to completion of the chatbot interaction, and outputting a final summary of the chatbot interaction, wherein the final summary of the chatbot interaction is based, at least in part, on the updated summary.

20 Claims, 14 Drawing Sheets

Conversation summary between SAM and the client

Context: the customer can have a pre-authorized loan of €50,000.

Conversation summary between SAM and the client

*Context:* the customer can have a pre-authorized loan of €50,000.

Conversation summary between SAM and the client

*Context: the customer can have a pre-authorized loan of €50,000.*

Conversation summary between SAM and the client

*Project*: The customer is planning some building project within the next 6 months, and is estimating an €20,000 budget for this project.
*Context*: the customer can have a pre-authorized loan of €50,000 to finance his project.
*Proposition*: a simulation has been done with SAM. A loan of €20,000 over a period of 11 months with monthly payments of €2,000.

FIG. 13

CHATBOT WITH PROGRESSIVE SUMMARY GENERATION

RELATED APPLICATIONS

This application claims priority under 35 U.S.C. § 119(e) to U.S. Provisional Application No. 63/018,889 filed May 1, 2020 and entitled, "CHATBOT WITH PROGRESSIVE SUMMARY GENERATION," the entire contents of which is incorporated by reference herein.

BACKGROUND

A chatbot is a software application often used in dialog systems to gather information, provide customer service or perform some other task in place of a user interacting directly with a live human agent. Some chatbots employ natural language processing or other artificial intelligence techniques to interpret user input and/or to provide responses that more closely simulate natural human interactions with the user.

Natural language generation is the generation of human-language text (i.e., text in a human language) based on information in non-linguistic form. For example, natural language generation techniques may be used to generate a report for a business based on financial data about the business, to generate a textual description of a day of trading of a particular stock based on data indicating the price of the stock throughout the day, to generate a confirmation e-mail for an online purchase made via the Internet based on data describing the purchase, to generate real-time comments about a sporting event using data about the game, or to generate text for a chatbot for communicating with a customer based on data about the customer.

SUMMARY

Some embodiments relate to a method of summarizing a chatbot interaction with a user. The method comprises using at least one computer hardware processor to perform generating an initial summary based, at least in part, on user data, receiving first input from the user during the chatbot interaction, processing the first input with a natural language processing engine, updating the initial summary based, at least in part, on an output of the processing by the natural language processing engine to generate an updated summary, wherein the updating is performed prior to completion of the chatbot interaction, and outputting a final summary of the chatbot interaction, wherein the final summary of the chatbot interaction is based, at least in part, on the updated summary.

In at least one aspect, generating the initial summary is performed prior to initiating the chatbot interaction.

In at least one aspect, the user data is received over a network from an application executing on at least one computer.

In at least one aspect, outputting the final summary of the chatbot interaction comprises providing the final summary of the chatbot interaction to the application.

In at least one aspect, the final summary of the chatbot interaction is a same summary as the updated summary.

In at least one aspect, generating an initial summary comprises including information in the initial summary describing a service proposition for the user.

In at least one aspect, the method further comprises receiving second user input from the user during the chatbot interaction, processing the second input with the natural language processing engine, and updating the initial summary based, at least in part, on an output of the processing by the natural language processing engine to generate an updated summary comprises updating the initial summary based on output of the processing of the first input and the second input by the natural language processing engine.

In at least one aspect, the method further comprises processing the output of the natural language processing engine by a dialog manager to determine a next dialog interaction module, and providing a request to the user based on the determined next dialog interaction module.

In at least one aspect, the method further comprises processing using the natural language processing engine, information from the next dialog interaction module to determine the request provided to the user.

In at least one aspect, the updated summary includes a plurality of categories of information, and updating the initial summary based, at least in part, on an output of the processing by the natural language processing engine comprises adding a new category of information to the initial summary.

Some embodiments relate to a computer system comprising a communications interface configured to receive first input from a user during a chatbot interaction and user data, a natural language processing engine configured to process the first input, and at least one computer hardware processor programmed to generate an initial summary based, at least in part, on user data, update the initial summary based, at least in part, on an output of the processing by the natural language processing engine to generate an updated summary, wherein the updating is performed prior to completion of the chatbot interaction, and output a final summary of the chatbot interaction, wherein the final summary of the chatbot interaction is based, at least in part, on the updated summary.

Some embodiments relate to at least one non-transitory computer-readable storage medium storing processor executable instructions that, when executed by at least one computer hardware processor, cause the at least one computer hardware processor to perform a method of summarizing a chatbot interaction with a user. The method comprises using at least one computer hardware processor to perform generating an initial summary based, at least in part, on user data, receiving first input from the user during the chatbot interaction, processing the first input with a natural language processing engine, updating the initial summary based, at least in part, on an output of the processing by the natural language processing engine to generate an updated summary, wherein the updating is performed prior to completion of the chatbot interaction, and outputting a final summary of the chatbot interaction, wherein the final summary of the chatbot interaction is based, at least in part, on the updated summary.

Some embodiments relate to a method of performing dialog management for a chatbot. The method comprises using at least one computer hardware processor to perform selecting a first dialog module, the first dialog module including at least one first object specifying first information to obtain from a user of the chatbot, generating using a natural language processing engine, at least one first natural language expression based on the first information specified in the at least one first object of the first dialog module, sending the at least one first natural language expression to a chatbot interface on a user device, receiving, from the user device, response information from the user, determining using the natural language processing engine, at least one second natural language expression, wherein the at least one second natural language expression is determined based on the received response information from the user, sending the at least one second natural language expression to the chatbot interface on the user device, and generating a summary of an interaction between the chatbot and the user based, at least in part, on one or more outputs of the natural language processing engine.

In at least one aspect, selecting a first dialog module comprises selecting the first dialog module based, at least in part, on information about the user.

In at least one aspect, generating a summary of an interaction between the chatbot and the user comprises generating a summary of the interaction based, at least in part, on the at least one first natural language expression and/or the at least one second natural language expression.

In at least one aspect, the method further comprises interpreting the received response information using the natural language processing engine to generate NLP output, and generating a summary of an interaction is based, at least in part, on the NLP output.

In at least one aspect, the method further comprises determining whether the received response information includes the first information, and selecting a second dialog module when it is determined that the received response information includes the first information, the second dialog module including at least one second object specifying second information to obtain from the user of the chatbot, wherein generating the at least one second natural language expression is based on the second information specified in the at least one second object of the second dialog module.

In at least one aspect, generating the summary of the interaction is performed only when it is determined that the received response information includes the first information.

In at least one aspect, the first information includes a first data slot and a second data slot, and determining using the natural language processing engine, at least one second natural language expression comprises determining that the received response information does not include information for the first data slot and/or the second data slot, and generating the at least one second natural language expression is based on the information for the first data slot and/or the second data slot not included in the received response information.

It should be appreciated that all combinations of the foregoing concepts and additional concepts discussed in greater detail below (provided such concepts are not mutually inconsistent) are contemplated as being part of the inventive subject matter disclosed herein.

BRIEF DESCRIPTION OF DRAWINGS

FIG. 13 illustrates the CRM application user interface of FIG. 12 in which chatbot interaction summary information generated in accordance with some embodiments, is shown.

DETAILED DESCRIPTION

The inventors have recognized and appreciated that it may be advantageous to generate a summary of an interaction between a chatbot and a user. Such a summary may be provided, for example, to a third party application that enables a user of the third party application to follow up directly with the chatbot user to complete a transaction initiated during the chatbot interaction. Furthermore, the inventors have recognized that for chatbots that employ natural language processing, the summary may be generated using, at least in part, results determined from the natural language processing to, for instance, provide a summary formulated more closely to how a human might summarize the chatbot interaction. To this end, some embodiments relate to progressively generating a summary of a chatbot interaction during the interaction.

Figure 1:
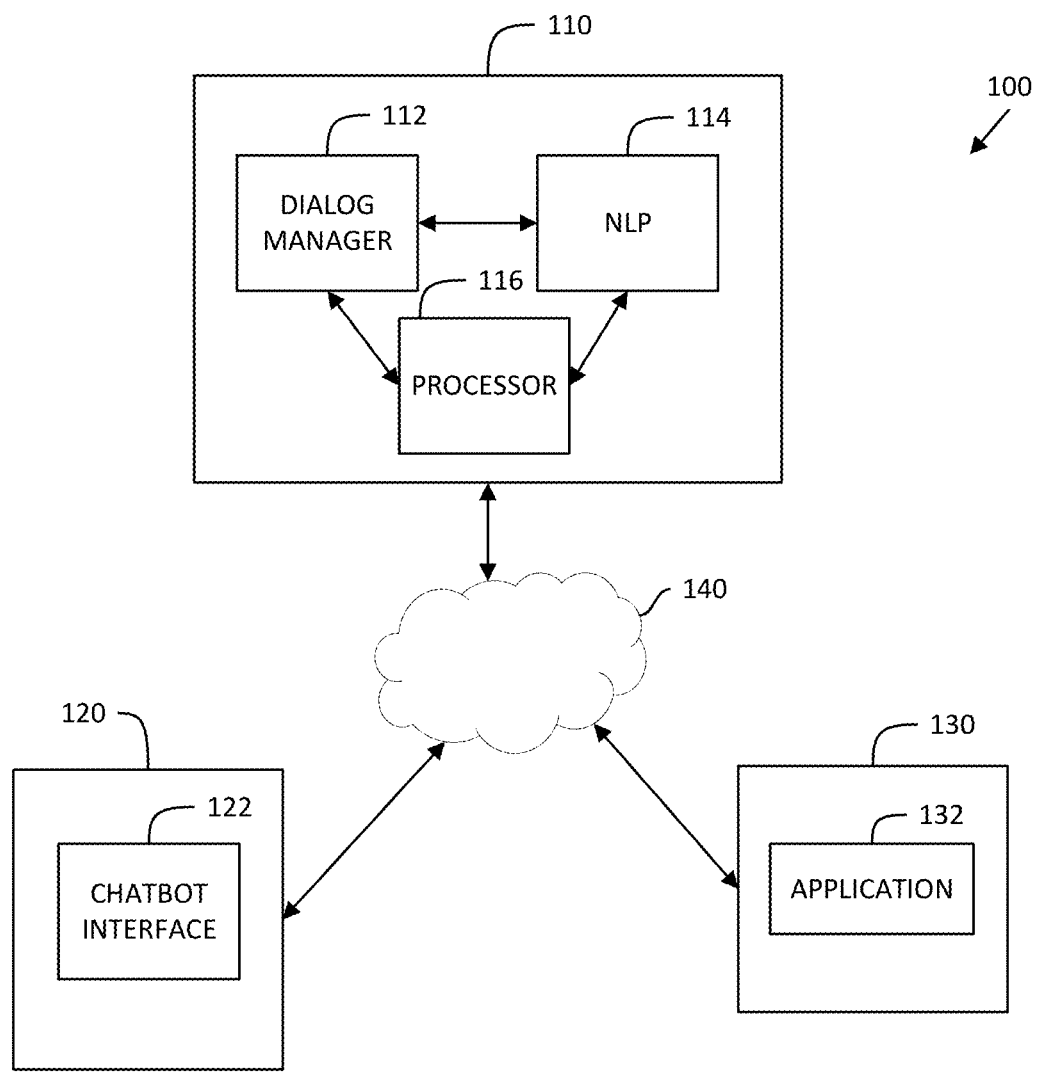
FIG. 1 shows a block diagram of a system for implementing chatbot functionality in accordance with some embodiments.

FIG. 1 schematically illustrates a system 100 for implementing chatbot functionality in accordance with some embodiments. As shown, system 100 includes three primary components connected by a network 140. Network 140 may be a wired network, a wireless network, or any combination thereof. In some embodiments, network 140 comprises the Internet. Server computer 110 includes a communications interface (not shown) configured to communicate with a chatbot application installed on a client computer 120. The chatbot application executing on client computer 120 is configured to present a chatbot interface 122 to a user which enables the user to interact with the chatbot to provide information. Client computer 120 may be implemented using any computing technology including, but not limited to, a mobile device (e.g., a smartphone), a portable device (e.g., a laptop computer, a smart speaker) and a desktop computer. Information obtained by the chatbot application via that chatbot interface may be provided to the server computer 110. The server computer may interpret the received information to determine the chatbot's response for a next iteration of the chatbot interaction and to generate a summary of the chatbot interaction, as discussed in more detail below. System 100 also includes application computer 130 configured to execute an application 132. In some embodiments, the application 132 provides information about the user of the chatbot to the server computer 110 to, for example, initialize a chatbot dialog with the user and/or a summary of a chatbot interaction prior to initiation of the chatbot session. Application 132 (or another application executing on application computer 130) may be configured to receive a summary of a chatbot interaction generated by server computer 110 to, for instance, follow up with the user of the chatbot to finalize a transaction or perform some other action, examples of which are described in more detail below. Although server computer 110, client computer 120 and application computer 130 are shown as distinct components in FIG. 1, it should be appreciated that any suitable architecture may alternatively be used. For example, functionality shown as being performed by one component may be performed by another component or multiple components may be combined together into a single component (e.g., dialog functionality and/or NLP functionality may be implemented on application computer 130). Additionally, each of server computer 110, client computer 120 and application computer 130 may include multiple computers or processors, each of which is configured to implement separate functionality. For instance, server computer 110 may include multiple processors for implementing the functionality of dialog management, natural language processing, and summary generation, and embodiments are not limited in this respect.

Server computer 110 includes a dialog manager 112 configured to manage dialog on behalf of the chatbot application during a chatbot interaction. In one implementation the dialog manager includes a plurality of dialog modules used to determine the content of dialog messages produced by the chatbot application and a plurality of rules used to determine when to execute a next dialog module. Each dialog module may include one or more slots or "objects" identifying information to acquire from the user during a chatbot interaction. Upon receiving input from a user during the chatbot interaction, the dialog manager may determine whether all objects in a current dialog module have been filled with information provided from the user. If not, one or more follow up questions may be provided to the chatbot application in an attempt to acquire the missing information.

Figure 2:
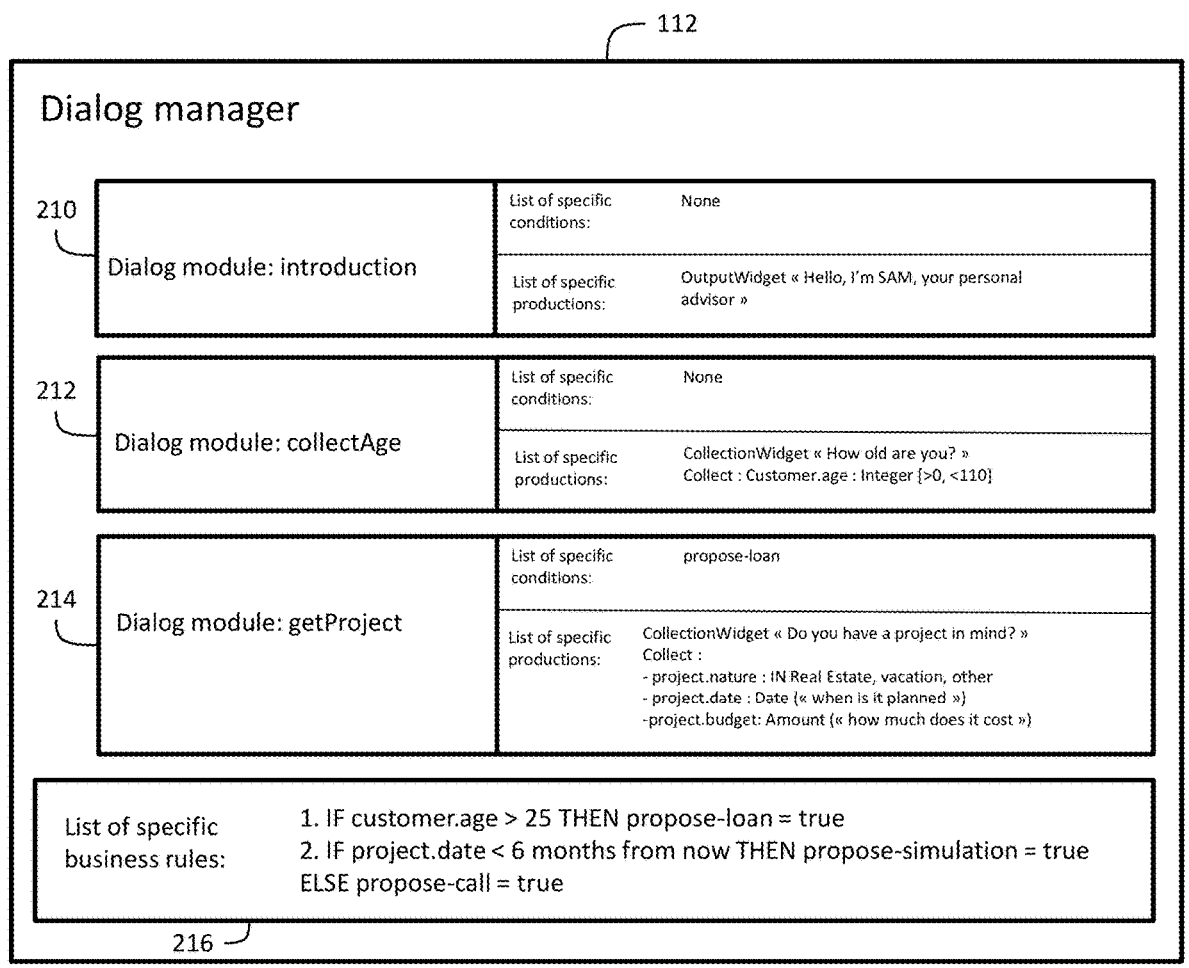
FIG. 2 schematically illustrates an example of dialog modules and business rules used by a dialog manager of a chatbot in accordance with some embodiments.

Dialog manager 112 may implement a plurality of rules to determine which dialog module should be executed next in the chatbot interaction. The decision on which dialog module to execute next may be based, at least in part, on output from natural language processing engine 114, as described in more detail below. FIG. 2 illustrates an example of dialog modules that may be executed by the dialog manager 112 in accordance with some embodiments. Dialog module 210 is configured to introduce the chatbot to the user, dialog module 212 is configured to collect age information from the user, and dialog module 214 is configured to determine project-specific information from the user.

Dialog manager 112 may be configured to execute particular dialog modules based on one or more business rules 216, examples of which are shown in FIG. 2. The plurality of rules may be dependent on the particular application for which the chatbot is designed. For instance, in the example described below of a chatbot used to acquire information for a loan approval process, a first dialog module may be configured to determine information about a project for a loan, a second dialog module may be configured to determine how much of the project the user intends to pay for with a loan, and a third dialog module may be configured to determine the loan parameters. Rules implemented by the dialog manager may be used to determine when to transition from one dialog module to another dialog module during the chatbot interaction based on the information received from the user during the interaction.

Server computer 100 also includes natural language processing (NLP) engine 114 configured to perform natural language processing on input received from the chatbot application (e.g., using natural language understanding (NLU)) and/or on output of the dialog manager to generate natural language text expressions to send to the chatbot application (e.g., using natural language generation (NLG)). NLP engine 114 may be configured to implement any suitable natural language processing techniques and embodiments of the technology described herein are not limited by the particular NLP techniques used. For instance, NLP engine 114 may be implemented using one or more language models that are trained using machine learning techniques to transform the output of dialog modules provided from dialog manager 112 into natural chatbot dialog text that is presented to a user during a chatbot interaction.

In some embodiments, NLP engine 114 is configured to perform natural language generation using semantic objects, as described, for example in U.S. patent application Ser. No. 16/868,685, filed May 7, 2020, titled "Natural Language Generation Using Semantic Objects," the entirety of which is incorporated by reference herein.

Figure 3:
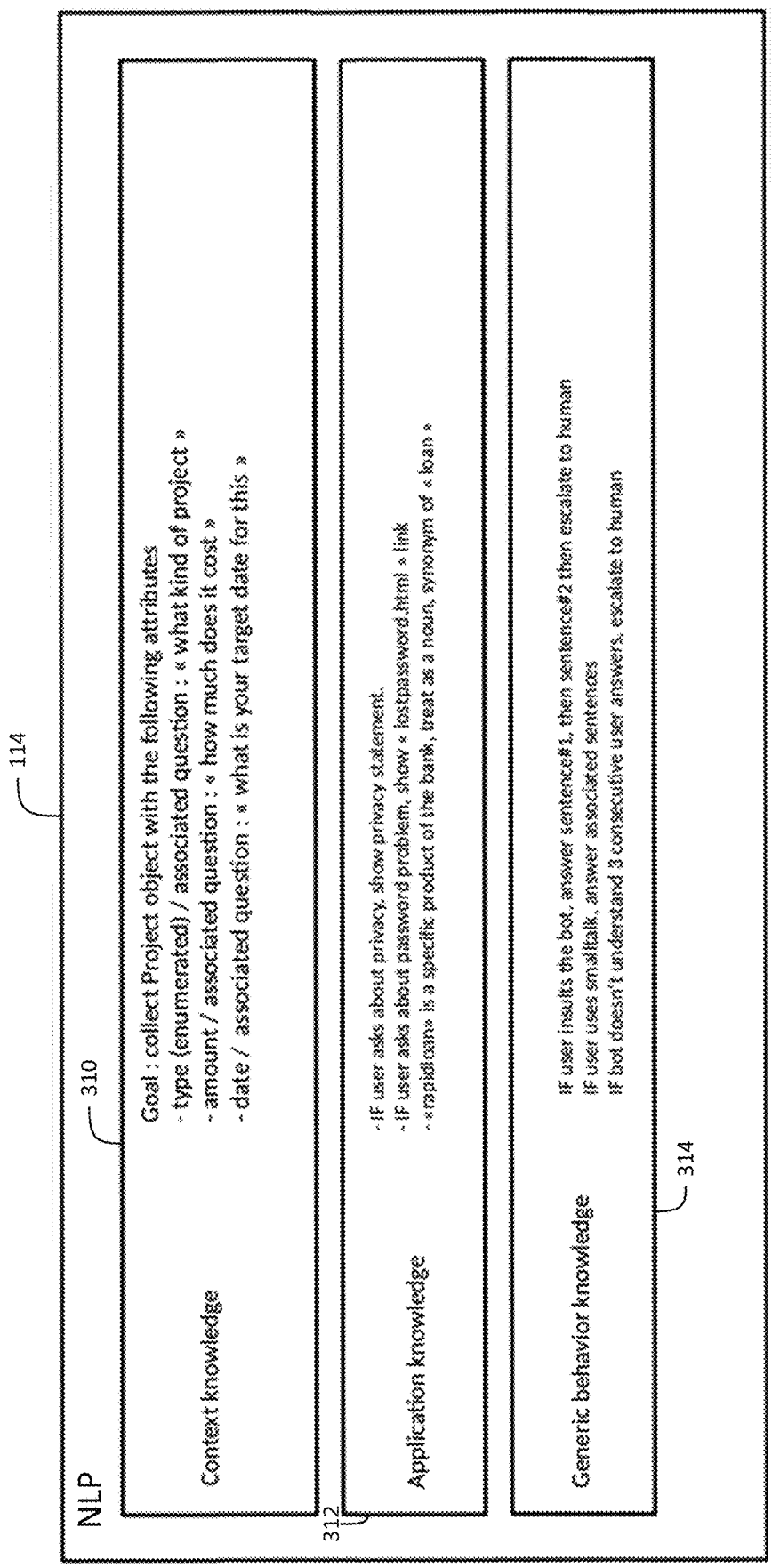
FIG. 3 schematically illustrates types of knowledge used by a natural language processing engine to interpret chatbot response data and to generate natural language expressions for a chatbot interaction in accordance with some embodiments.

FIG. 3 illustrates exemplary types of knowledge that NLP engine 114 may use when performing natural language processing in accordance with some embodiments. Context knowledge 310 includes knowledge about the particular project or transaction associated with the chatbot dialog. Application knowledge 312 includes application-specific knowledge for interpreting user input that relates to the project or transaction but that does not specifically address the chatbot questions posed in the prior interaction to be able to complete the context. Generic behavior knowledge 314 includes knowledge of how to interpret general behavior/input of the user, which is not application-specific. For instance, generic behavior knowledge 314 may include knowledge regarding how to interpret the user insulting the chatbot or indicating that they don't understand. The NLP engine 114 may use these knowledge sources to interpret user input provided from the client computer 120 to be able to inform the dialog manager how to proceed with the chatbot interaction.

Server computer 100 also includes processor 116 configured to generate a summary of a chatbot interaction with a user based, at least in part, on processing by NLP engine 114. The inventors have recognized that progressively building a summary of a chatbot interaction as a user provides information during a chatbot interaction enables generation of final summary of the conversation that takes into consideration relevant context as information is collected from the user during the interaction. By using the output of the NLP engine 114 to generate the summary during the interaction, the resulting summary may more accurately represent the salient points of the interaction than if the summary were to be generated only after the interaction has completed. Additionally, in some embodiments, generating the summary during the chatbot interaction reduces the memory requirements of the chatbot implementation by not requiring every part of the interaction to be stored prior to generation of the final summary. Rather, the summary may be generated incrementally at each step of the summary generation process. Progressive summary generation also enables the generation of summaries when non-dedicated user devices (e.g., a web browser) are used to provide a chatbot. Such devices may not send information about a chatbot interaction to server computer 110 when the user discontinues the chatbot interaction, for example, by closing a browser window or ceasing to interact with the chatbot without explicitly exiting the chatbot interface.

Client computer 120 includes a chatbot interface 122 configured to present a chatbot to a user for interaction. Chatbot interface 122 may be implemented in any suitable way. For instance, chatbot interface 122 may be implemented by a web-based application executing within a web browser executing on the client computer. Alternatively, chatbot interface 122 may be implemented by a standalone chatbot application (e.g., a virtual assistant application) stored on the client computer 120. Chatbot interface 122 may be configured to interact with a user (e.g., using voice, text or both) to obtain information from the user. The information obtained from the user may be transmitted to server computer 110 for processing by NLP engine 114 as discussed above.

Application 132 executing on application computer 130 may store information about a user that interacts with a chatbot provided by client computer 120. For instance, application 132 may be a banking application that stores account information for a plurality of users. Based on the stored user information, one or more of the plurality of users may be eligible for a loan from a bank. The stored user information may be used to construct a campaign notifying the eligible users that they qualify for a loan, which may form the basis for an initial message in a chatbot interaction. User information stored in association with application 132 may be transferred to server computer 110 to facilitate chatbot functionality implemented by the server computer. For instance, the user information may be used to generate an initial summary of a chatbot interaction as described in more detail below or may be used by the server computer 110 for some other purpose.

The inventors have recognized and appreciated that generating a summary of a chatbot interaction between a user and a chatbot may be useful when, for example, further action related to the chatbot interaction is desired or needed. For instance, the chatbot may be able to gather most of the information from a user needed to execute a transaction or schedule a service and a human user may pick up where the chatbot left off the conversation to finish executing the transaction or scheduling the service. Providing a summary of the chatbot interaction will help enable the human user to adequately prepare for the discussion with the chatbot user. To this end, some embodiments are directed to generating a summary of chatbot interaction based, at least in part, on natural language processing performed during the chatbot interaction.

Figure 4:
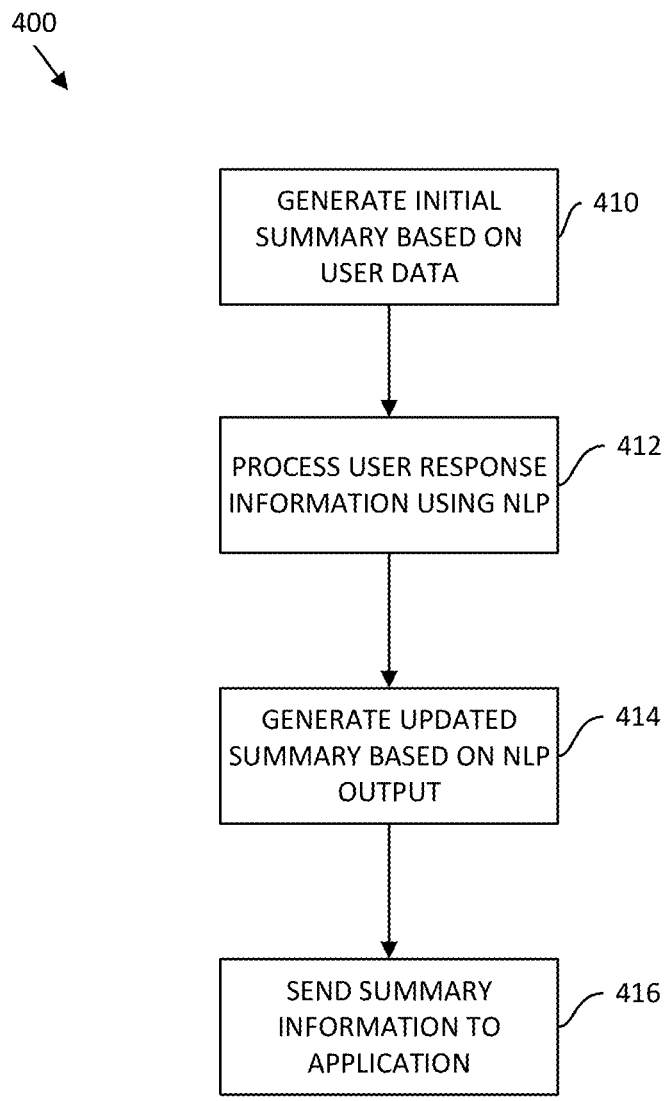
FIG. 4 is a flowchart of a process for generating a summary of a chatbot interaction in accordance with some embodiments.

FIG. 4 illustrates a process 400 for generating a summary of a chatbot interaction between a chatbot and a user in accordance with some embodiments. In act 410 an initial summary is generated based on user data received, for example, from an application over a network. In the example provided below, the application is a banking application used by lenders to approve loans from a bank. However, it should be appreciated that user information may be received from any suitable source and aspects of the technology described herein are not limited in this respect. In some embodiments, the initial summary generated in act 410 is generated prior to initiating a chatbot interaction with a user. For instance, the initial summary may be generated based on user information received from an external application and/or context knowledge stored by the NLP engine. The initial summary may include a service or transaction proposition that will be presented to the user via the chatbot interface. For example, the initial summary may indicate that the user is eligible for a loan of X amount as determined by the user's bank account, credit information, and/or other information about the user.

Process 400 then proceeds to act 412, where user response information is received by the server computer from the chatbot application executing on the client computer and is processed by the NLP engine using one or more natural language understanding (NLU) techniques. For instance, the NLP engine may use stored context knowledge to interpret the user's input to generate NLP output. The output of the NLU processing may be provided to the dialog manager to determine a next dialog interaction for the chatbot interaction or may be used to generate a natural language expression using natural language generation (NLG) to provide to the chatbot application.

Process 400 then proceeds to act 414 where the NLP output is used to generate an updated summary of the chatbot interaction. A summary of the chatbot interaction may be generated in a progressive manner prior to completion of the chatbot interaction such that the summary is changed as the interaction progresses and more information is obtained from the user. In some embodiments, the entire context of the chatbot interaction as processed by the NLP engine is considered each time the updated summary is generated rather than simply adding additional content to a previously-generated summary. In this way information stored in a previous summary may be modified as appropriate based on new information provided to the user to ensure that the updated summary accurately summarizes the interaction. In some embodiments user information determined from sources other than the chatbot interaction may also be used to generate the updated summary.

In some embodiments the summary includes a plurality of categories and updating the summary comprises adding a new category to the previously-included categories in the summary. For instance, the initial summary may only include a single context category describing generally the proposition to be presented to the chatbot user. As new information is received from the user during the chatbot interaction, the summary may be updated to include additional categories such as a category describing a particular project or result of the chatbot interaction. It should be appreciated that the use of categories is merely exemplary and some embodiments may include summaries without any categories. Additionally, for embodiments that include categories, the categories may be depend on the particular type of service or transaction being offered in the chatbot interaction. It should be appreciated however, that not all embodiments generate summaries using categories and aspects of the technology described herein are not limited in this respect.

After the chatbot interaction has finished, process 400 proceeds to act 416 where a final summary based, at least in part, on the updated summary is sent to an application (e.g., a customer relationship management (CRM) application). The final summary may be sent to the application in any suitable way. In one implementation the information in the final summary is represented using high-level XML tags (e.g., title, subtitle, paragraph, enumeration, etc.). The high-level XML tags may then be mapped to markup (e.g., HTML markup) for integration into a web browser or integrated into different markup for a target application (e.g., using extensible stylesheet language (XSL) to transform input XML into JavaScript Object Notation (JSON), YAML Ain't Markup Language (YAML), or another format).

The application to which the final summary is sent may be the same application that provided the user information used to generate the initial summary or a different application with which a human user may interact to access the summary of the chatbot interaction. In some embodiments, the final summary is identical to the most recent updated summary generated by the server computer. In other embodiments, the final summary may be a changed version of the most recent updated summary. For example, the final summary may be a reformatted version of the updated summary and/or a version of the updated summary that includes additional information such as dialog metadata, for instance, elapsed dialog time.

Figure 5:
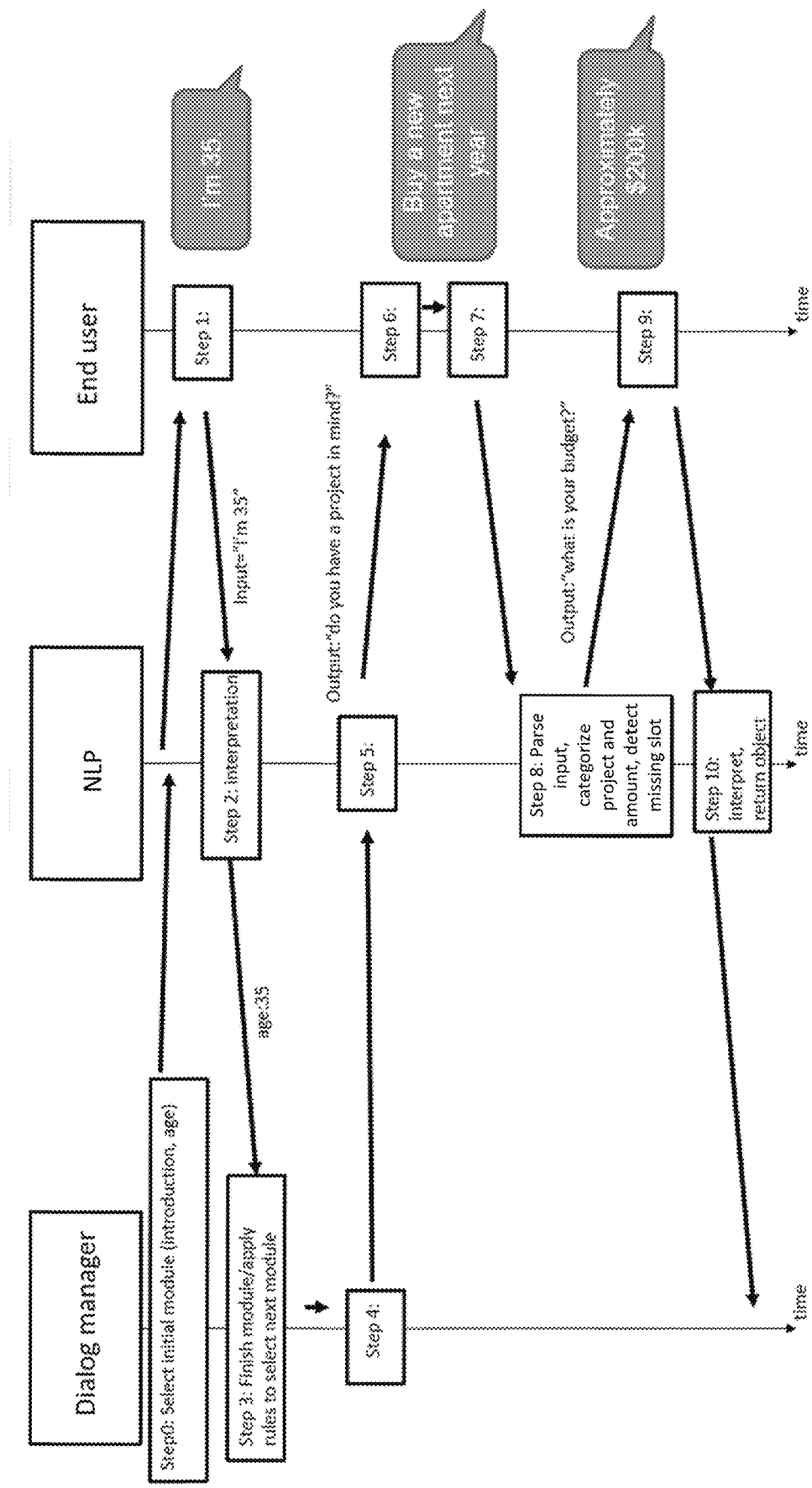
FIG. 5 is a flowchart of a process for interpreting chatbot response data and generating natural language expressions for a chatbot interaction in accordance with some embodiments.

FIG. 5 illustrates a flowchart of a process for implementing at least a portion of a chatbot interaction in a server computer in accordance with some embodiments. In Step 0 the dialog manager selects an initial dialog module for the dialog interaction. As shown, information about the initial dialog module is then sent to the NLP engine, which uses natural language generation to generate a natural language expression to send to the chatbot application for presentation to a user. As discussed above, in some embodiments an initial summary may be generated prior to sending information to the chatbot to initiate the chatbot interaction. In Step 1 the user responds with an answer to the question posed by the chatbot and that information is transmitted to the NLP engine, which in Step 2 uses natural language understanding to interpret the input using, for example, context knowledge stored by the NLP engine. The initial summary may then be updated based on the NLP output. It should be appreciated, however, that the summary need to be updated each time an NLP output is generated, and embodiments are not limited in this respect. For instance, in some embodiments, the summary is only updated when an interaction between the chatbot and the user produces data that enables completion of all information required for a dialog module or an object within a dialog module.

The NLP output generated in Step 2 is then sent to the dialog manager to determine in Step 3 whether all information in the dialog module has been completed by the user, and if so, which dialog module should be executed next. The decision by the dialog manager of a next action to take in the dialog interaction is made in Step 4 and information about this decision is sent to the NLP engine, which in Step 5 uses natural language generation to generate a natural language expression to send to the chatbot application for presentation to a user. In Step 6 the user responds to the query from the chatbot and in Step 7 that information is transmitted to the NLP engine for processing using natural language understanding techniques. As shown, communication between the NLP engine and the chatbot application may continue until all slots for a dialog module are completed by the user without sending information to the dialog module. For instance, in Step 8 the NLP engine parses the input provided by the user and determines that additional information to complete the dialog module is needed. The NLP engine then uses natural language generation to generate a natural language expression to send to the chatbot application for presentation to the user requesting the missing information. In Step 9 the user provides the requested information, which is then sent back to the NLP engine for interpretation using natural language understanding techniques. At Step 10 the NLP engine determines that all of the information for the dialog module is complete and the NLP engine sends a request to the dialog manager to determine a next dialog module to continue the chatbot interaction or determine that the chatbot interaction should end. In embodiments that only update the summary after all information for a dialog module is completed, the summary may be updated following Step 10 in which the NLP engine determined that all information for the current dialog module has been provided by the user.

FIGS. 6-11 illustrate sequential screenshots of an exemplary user interface for a chatbot application executing on a client device (e.g., client device 120 of FIG. 1) as a chatbot interaction progresses. Each of FIGS. 6-11 also shows a description of a summary that is progressively generated during the course of the chatbot interaction in accordance with the techniques described herein. It should be appreciated that although the summary of the chatbot interaction is displayed in each of FIGS. 6-11 that the summary may not be displayed to the chatbot user in some embodiments, but may be maintained by the server computer as described above.

Figure 6:
FIGS. 6-11 illustrate a sequence of user interface screenshots of an example chatbot interaction in accordance with some embodiments.

FIG. 6 shows an initial screen of a chatbot interface for an e-banking application. In the initial screen, the user is provided introductory information indicating that they have qualified for a pre-authorized loan and asking if they would like to discuss the opportunity. User information stored by a banking application (e.g., by application 132 on application computer 130 of FIG. 1) may have been used to identify the chatbot user as a customer of a bank that qualified for a pre-authorized loan. FIG. 6 also shows an initial summary that was generated based on the user's information. For instance, the initial summary includes information that the user is pre-authorized for a loan of a particular amount. As discussed above, in some embodiments the summary is generated using output of the NLP process at each step of the chatbot interaction. Generating the summary at each step of the interaction may enable the user to return to the chatbot interaction following an interruption and/or allow summaries of incomplete interactions to be transmitted to the banking application if desired, even if the user prematurely ends the chatbot interaction.

Figure 7:
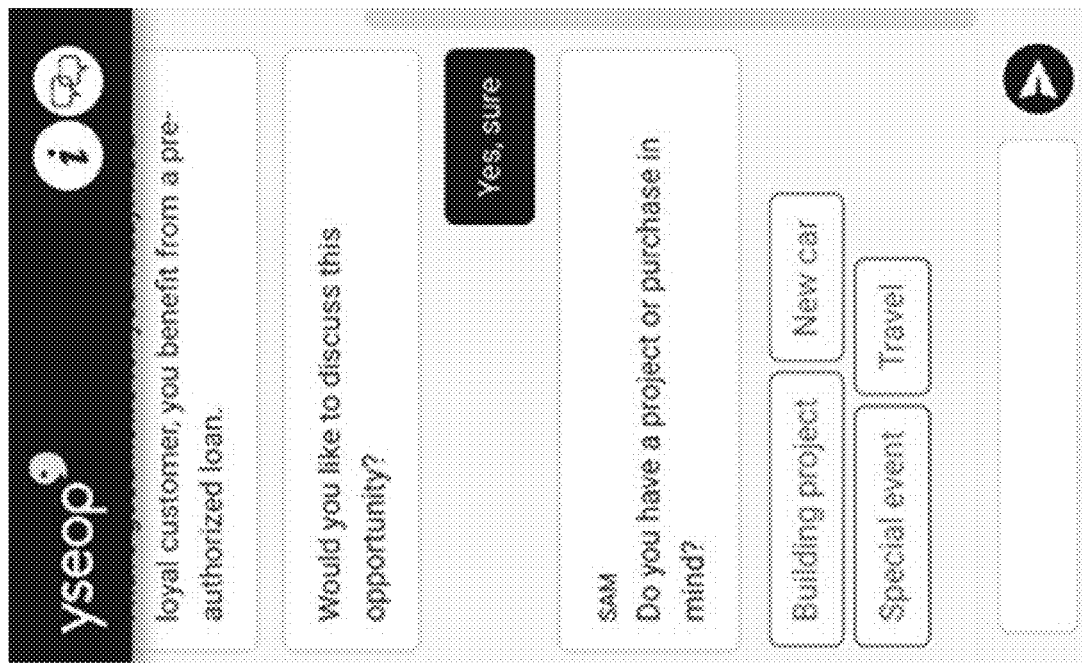

FIG. 7 illustrates a next iteration of the chatbot interaction in which the user has replied that they do wish to discuss the loan opportunity and the chatbot has inquired about the type of project or purchase that they wish to make using the funds from the loan. The chatbot interface may receive input from the user in any suitable way including, but not limited to speech input and text input. In the example shown in FIG. 7 the user has been provided with four selectable buttons to provide information in response to the chatbot query in addition to a text entry field that enables the user to enter text to provide a response. Note that although the user provided a response that the user would like to discuss the loan opportunity, that the summary of the chatbot interaction has not changed because no new information relative to filling information in objects of dialog modules has been provided by the user in this step. In some embodiments, when the user has indicated that they would like to discuss the opportunity presented, information may be stored to indicate that the user explicitly agreed to discuss the opportunity with the chatbot.

Figure 8:
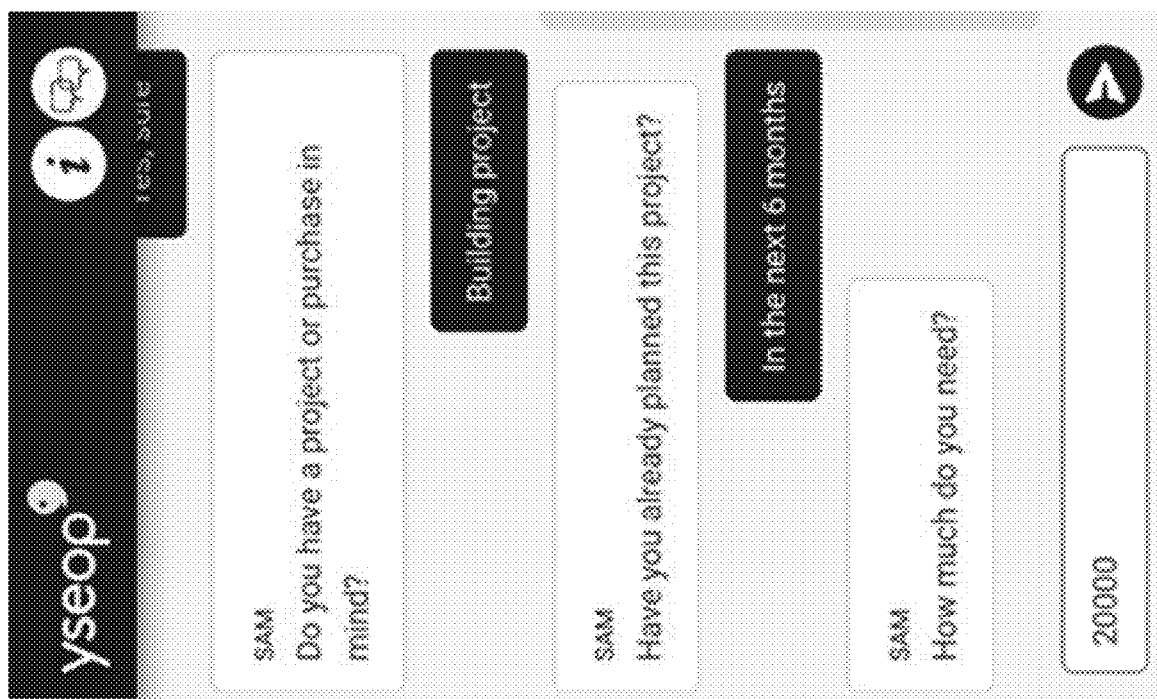
Figure 9:
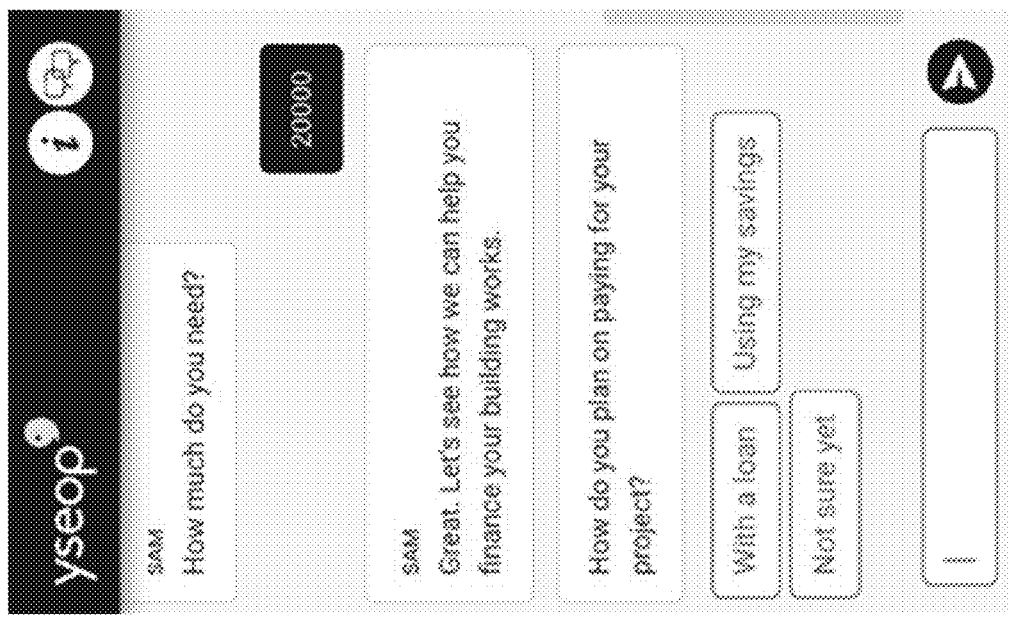

FIG. 8 illustrates a next iteration of the chatbot interaction in which the user has provided additional information about the type of project and amount of loan needed to complete the project. Upon submission of this information to the chatbot, the chatbot interaction proceeds to the screen shown in FIG. 9 in which the summary of the chatbot interaction is updated based on processing of the information provided by the user by the NLP engine as discussed above. As shown in FIG. 9, the information collected in the prior interaction step—project kind, schedule, and amount needed—completes the project object in the dialog module, thereby triggering an update of the summary to include a description of the user's proposed project. As discussed above, in some embodiments, the entire record of the chatbot interaction is used to update the summary (e.g., the NLP engine may be stateless). FIG. 9 also shows that the user is asked additional questions regarding how the user is planning on paying for the proposed project. The user indicates that they would like to finance the project with a loan for the full amount.

Figure 10:
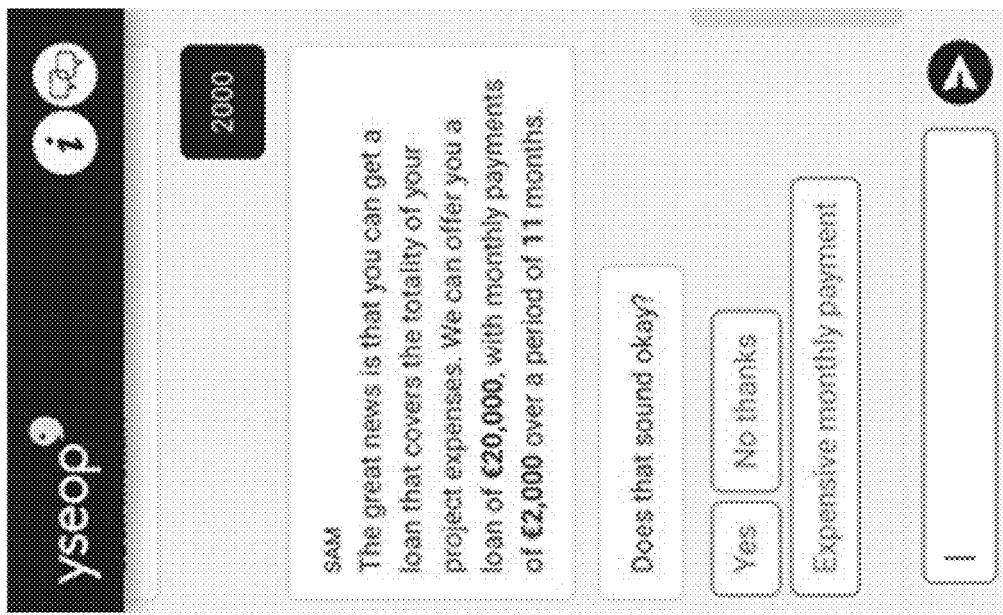

Upon submission of this information to the chatbot, the chatbot interaction proceeds to the screen shown in FIG. 10 in which the chatbot indicates that a loan for the entire amount of the project is approved and loan terms are provided with a request to confirm that the proposed terms are agreeable or whether the user would like to modify the proposed terms. As shown, the summary of the chatbot interaction has been updated again, now with the terms of the loan proposal included in the summary. The details of the proposal shown to the user in the chatbot may be repeated in the final summary such that the follow-up advisor has access to the exact wording provided to the chatbot user. In some embodiments, the terms of the loan proposal may be determined by the server computer or the application computer based on the provided project data and user information (e.g., customer segmentation data) provided by the banking application.

Figure 11:
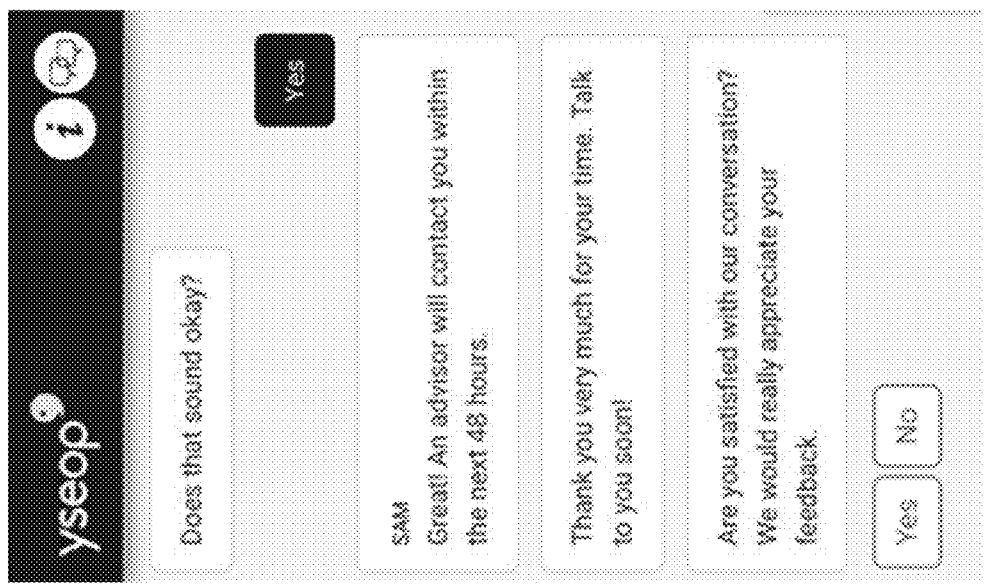

In the example shown in FIGS. 6-11, the user indicates that they approve the loan terms after which the chatbot interaction proceeds to the screen shown in FIG. 11 in which the chatbot indicates that the user will be contacted shortly by a human advisor to discuss the loan terms. As shown, the summary of the chatbot interaction is updated and finalized to include information that the user has agreed to discuss the loan terms with an advisor.

Figure 12:
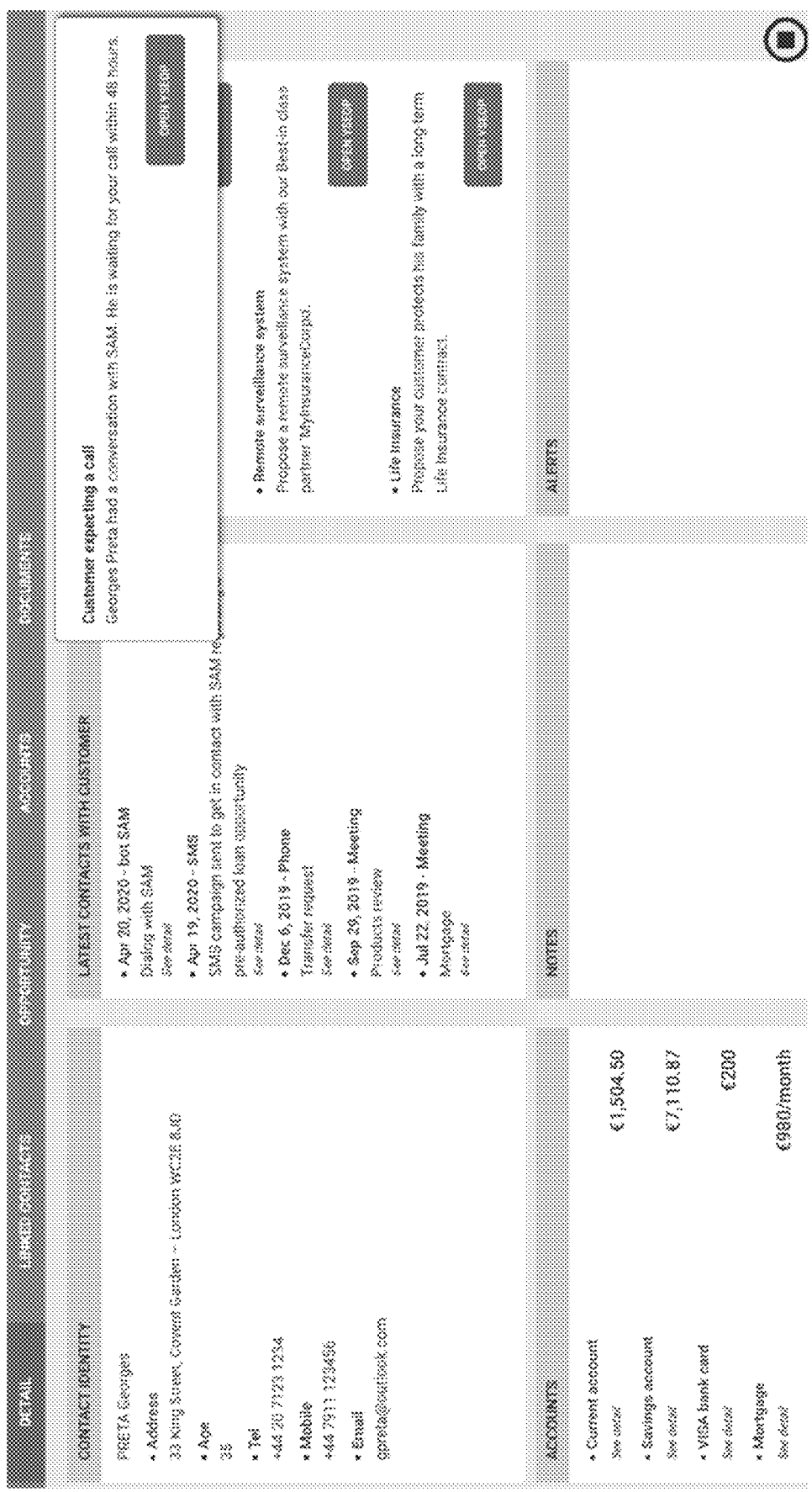
FIG. 12 illustrates a customer relationship management (CRM) application user interface configured to receive chatbot interaction summary information in accordance with some embodiments.

FIG. 12 shows an example of a user interface of a customer relationship management (CRM) application configured to receive a summary of a chatbot interaction generated in accordance with the techniques described herein. For instance, the user interface shown in FIG. 12 may be provided to a loan advisor who is tasked with following up with the chatbot user to finalize the terms of the loan. As shown, the CRM application user interface includes information about the chatbot user including bank account information and the user's history of interacting with the bank.

Figure 13:
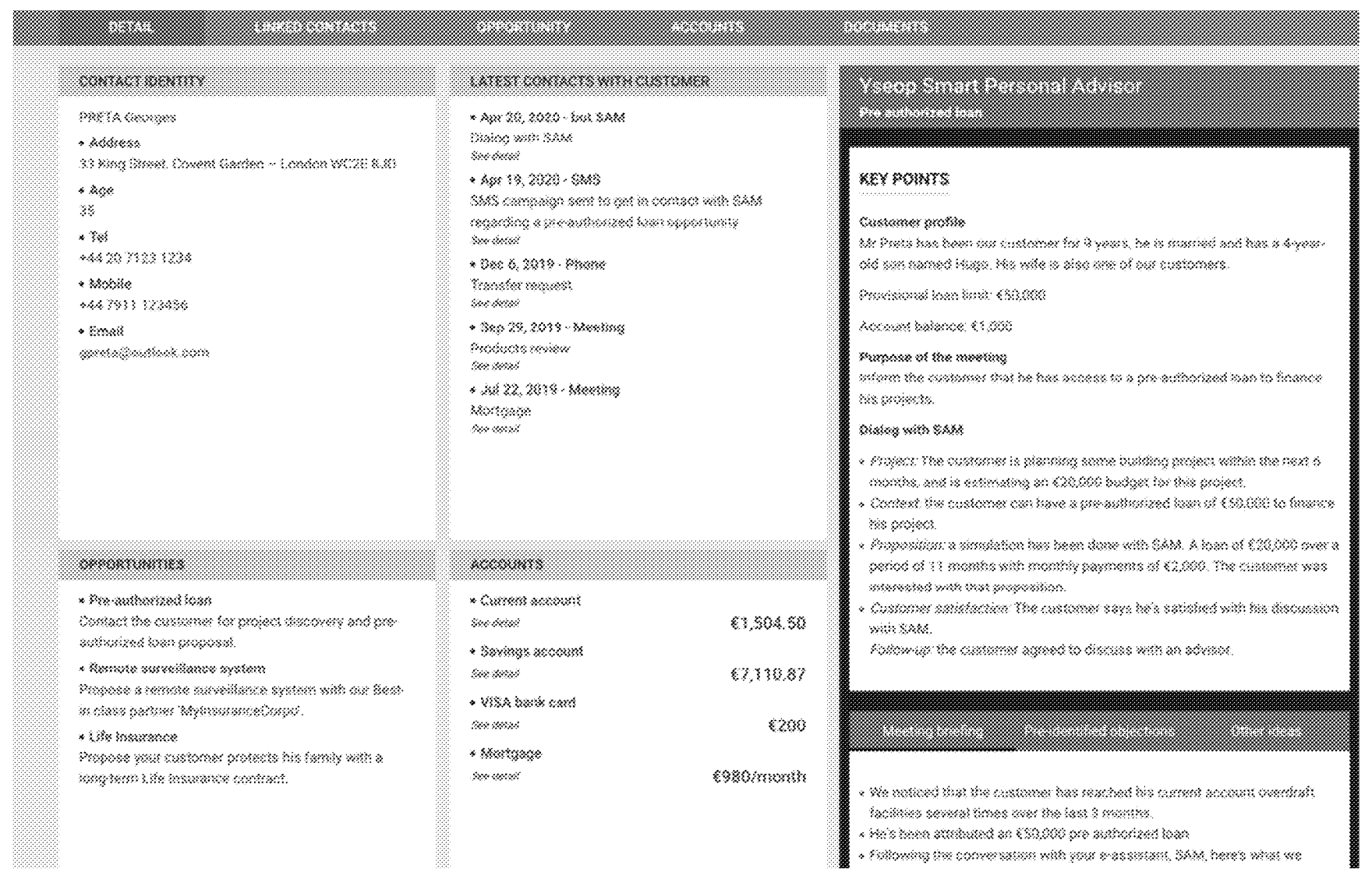

FIG. 13 shows another example of the user interface for the CRM application in which the summary of the chatbot interaction has been included to assist the loan advisor with preparing for and conducting the follow up discussion with the chatbot user. In addition to the summary of the user's dialog with the chatbot, other information including a customer profile and meeting purpose information are also include to help the loan advisor prepare for the follow up discussion. In some embodiments, both the summary of the chatbot interaction and the additional information (e.g., customer profile, meeting purpose) may be generated by the NLP engine for presentation in the CRM application user interface.

Figure 14:
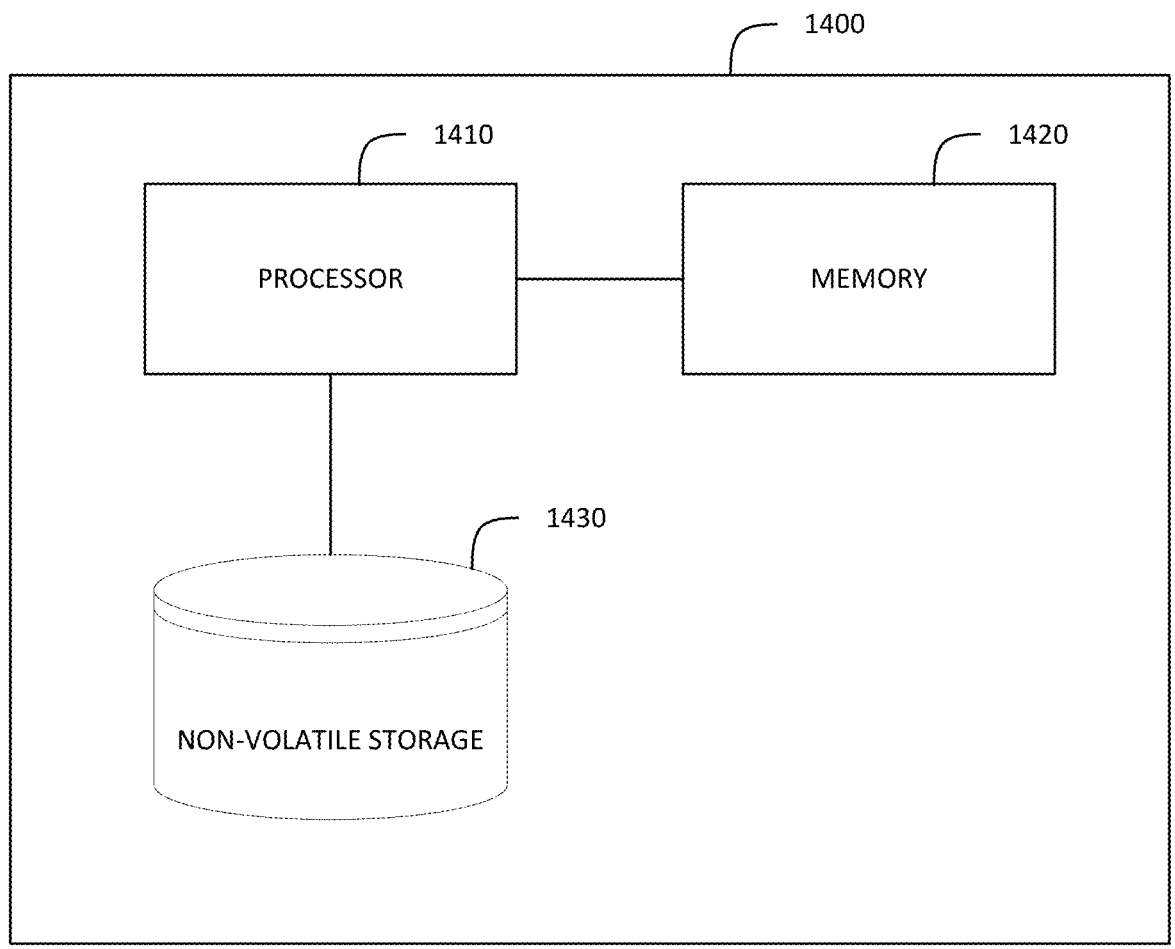
FIG. 14 schematically illustrates an exemplary computer system on which some embodiments may be implemented.

An illustrative implementation of a computer system 1400 that may be used in connection with any of the embodiments of the disclosure provided herein is shown in FIG. 14. The computer system 1400 may include one or more computer hardware processors 1410 and one or more articles of manufacture that comprise non-transitory computer-readable storage media (e.g., memory 1420 and one or more non-volatile storage media 1430). The processor(s) 1410 may control writing data to and reading data from the memory 1420 and the non-volatile storage device 1430 in any suitable manner, as the aspects of the technology described herein are not limited in this respect. To perform any of the functionality described herein, the processor(s) 1410 may execute one or more processor-executable instructions stored in one or more non-transitory computer-readable storage media (e.g., the memory 1420), which may serve as non-transitory computer-readable storage media storing processor-executable instructions for execution by the processor(s) 1410.

The terms "program" or "software" are used herein in a generic sense to refer to any type of computer code or set of processor-executable instructions that can be employed to program a computer or other processor to implement various aspects of embodiments as described herein. Additionally, in some embodiments, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided including with reference to FIGS. 4 and 5. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "substantially", "approximately", and "about" may be used to mean within ±20% of a target value in some embodiments, within ±10% of a target value in some embodiments, within ±5% of a target value in some embodiments, within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of summarizing a chatbot interaction with a first user, the method comprising:
   using at least one computer hardware processor to perform:
   receiving user data of the first user via a network from at least one application executing on at least one computer;
   generating an initial summary based, at least in part, on the received user data of the first user;
   receiving first input from the first user during the chatbot interaction;
   processing the first input with a natural language processing engine;
   updating the initial summary based, at least in part, on an output of the processing by the natural language processing engine to generate an updated summary, wherein the updating is performed prior to completion of the chatbot interaction; and
   outputting a final summary of the chatbot interaction, wherein the final summary of the chatbot interaction is based, at least in part, on the updated summary, wherein outputting the final summary of the chatbot interaction comprises providing the final summary of the chatbot interaction to the at least one application executing on the at least one computer, the at least one application enabling, at least in part, a second user to follow up with the first user to schedule and/or complete, based, at least in part, on the final summary, a service or transaction mentioned during the chatbot interaction.

2. The method of claim 1, wherein generating the initial summary is performed prior to initiating the chatbot interaction.

3. The method of claim 1, wherein the final summary of the chatbot interaction is a same summary as the updated summary.

4. The method of claim 1, further comprising:
   receiving second input from the first user during the chatbot interaction;
   processing the second input with the natural language processing engine; and
   wherein updating the initial summary based, at least in part, on the output of the processing by the natural language processing engine to generate the updated summary comprises updating the initial summary based on output of the processing of the first input and the second input by the natural language processing engine.

5. The method of claim 1, further comprising:
   processing the output of the natural language processing engine by a dialog manager to determine a next dialog interaction module; and
   providing a request to the first user based on the determined next dialog interaction module.

6. The method of claim 5, further comprising:
   processing using the natural language processing engine, information from the next dialog interaction module to determine the request provided to the first user.

7. The method of claim 1, wherein the updated summary includes a plurality of categories of information, and wherein updating the initial summary based, at least in part, on the output of the processing by the natural language processing engine comprises adding a new category of information to the initial summary.

8. The method of claim 1, wherein the initial summary comprises a notification to the first user that the first user is eligible, based, at least in part, on an evaluation of stored information concerning the first user, for a service or transaction proposition.

9. The method of claim 1, further comprising processing the output of the natural language processing engine by a dialog manager that uses slots and/or objects for identifying, grouping, and/or classifying information to acquire during the chatbot interaction and for determining whether additional input from the first user is necessary to complete a dialog module.

10. A computer system, comprising:
    a communications interface configured to receive first input from a first user during a chatbot interaction and user data of the first user;
    a natural language processing engine configured to process the first input; and
    at least one computer hardware processor programmed to:

receive the user data of the first user via a network from at least one application executing on at least one computer;

generate an initial summary based, at least in part, on the received user data of the first user;

update the initial summary based, at least in part, on an output of the processing by the natural language processing engine to generate an updated summary, wherein the updating is performed prior to completion of the chatbot interaction; and provide a final summary of the chatbot interaction, wherein the final summary of the chatbot interaction is based, at least in part, on the updated summary, to the at least one application executing on the at least one computer, the at least one application enabling, at least in part, a second user to follow up with the first user to schedule and/or complete, based, at least in part, on the final summary, a service or transaction mentioned during the chatbot interaction.

11. The computer system of claim 10, wherein the at least one computer hardware processor is programmed to generate the initial summary prior to receiving the first input.

12. The computer system of claim 10, wherein:
the communications interface is further configured to receive second input from the first user during the chatbot interaction,
the natural language processing engine is configured to process the second input, and
updating the initial summary based, at least in part, on the output of the processing by the natural language processing engine to generate the updated summary comprises updating the initial summary based on output of the processing of the first input and the second input by the natural language processing engine.

13. The computer system of claim 10, further comprising:
a dialog manager configured to process the output of the natural language processing engine to determine a next dialog interaction module,
wherein the natural language processing engine is further configured to:
provide a request to the first user based on the determined next dialog interaction module; and
process information from the next dialog interaction module to determine the request provided to the first user.

14. The computer system of claim 10, wherein the updated summary includes a plurality of categories of information, and wherein updating the initial summary based, at least in part, on the output of the processing by the natural language processing engine comprises adding a new category of information to the initial summary.

15. The computer system of claim 10, wherein the initial summary comprises a notification to the first user that the first user is eligible, based, at least in part, on an evaluation of stored information concerning the first user, for a service or transaction proposition.

16. The computer system of claim 10, wherein the communications interface is further configured to process the output of the natural language processing engine by a dialog manager that uses slots and/or objects for identifying, grouping, and/or classifying information to acquire during the chatbot interaction and for determining whether additional input from the first user is necessary to complete a dialog module.

17. At least one non-transitory computer-readable storage medium storing processor executable instructions that, when executed by at least one computer hardware processor, cause the at least one computer hardware processor to perform a method of summarizing a chatbot interaction with a first user, the method comprising:
using the at least one computer hardware processor to perform:
receiving user data of the first user via a network from at least one application executing on at least one computer;
generating an initial summary based, at least in part, on the user data of the first user;
receiving first input from the first user during the chatbot interaction;
processing the first input with a natural language processing engine;
updating the initial summary based, at least in part, on an output of the processing by the natural language processing engine to generate an updated summary, wherein the updating is performed prior to completion of the chatbot interaction; and
outputting a final summary of the chatbot interaction, wherein the final summary of the chatbot interaction is based, at least in part, on the updated summary, and wherein outputting the final summary of the chatbot interaction comprises providing the final summary of the chatbot interaction to the at least one application executing on the at least one computer hardware processor, the at least one application enabling, at least in part, a second user to follow up with the first user to schedule and/or complete, based, at least in part, on the final summary, a service or transaction mentioned during the chatbot interaction.

18. The at least one non-transitory computer-readable storage medium of claim 17, wherein generating the initial summary is performed prior to initiating the chatbot interaction.

19. The at least one non-transitory computer-readable storage medium of claim 17, wherein the method further comprises:
receiving second input from the first user during the chatbot interaction;
processing the second input with the natural language processing engine; and
wherein updating the initial summary based, at least in part, on the output of the processing by the natural language processing engine to generate the updated summary comprises updating the initial summary based on output of the processing of the first input and the second input by the natural language processing engine.

20. The at least one non-transitory computer-readable storage medium of claim 17, wherein the method further comprises:
processing the output of the natural language processing engine by a dialog manager to determine a next dialog interaction module;
providing a request to the first user based on the determined next dialog interaction module; and
processing using the natural language processing engine, information from the next dialog interaction module to determine the request provided to the first user.

* * * * *

UNITED STATES PATENT AND TRADEMARK OFFICE
CERTIFICATE OF CORRECTION

| | | |
|---|---|---|
| PATENT NO. | : 11,095,579 B1 | Page 1 of 1 |
| APPLICATION NO. | : 16/875420 | |
| DATED | : August 17, 2021 | |
| INVENTOR(S) | : Hugues Sézille de Mazancourt et al. | |

It is certified that error appears in the above-identified patent and that said Letters Patent is hereby corrected as shown below:

On the Title Page

In items (71) Applicant and (73) Assignee:
Please replace "Lyons" with --Lyon--.

Signed and Sealed this
Fifth Day of October, 2021

Drew Hirshfeld
*Performing the Functions and Duties of the
Under Secretary of Commerce for Intellectual Property and
Director of the United States Patent and Trademark Office*